United States Patent
Fuss et al.

(10) Patent No.: US 7,829,239 B2
(45) Date of Patent: Nov. 9, 2010

(54) VARIABLE CATALYST LOADING BASED ON FLOW FIELD GEOMETRY

(75) Inventors: Robert L Fuss, Spencerport, NY (US); Bhaskar Sompalli, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1056 days.

(21) Appl. No.: 11/581,600

(22) Filed: Oct. 16, 2006

(65) Prior Publication Data
US 2010/0248070 A1    Sep. 30, 2010

Related U.S. Application Data (63) Continuation of application No. 10/700,237, filed on Nov. 3, 2003, now abandoned.

(51) Int. Cl.
H01M 8/04    (2006.01)
H01M 8/10    (2006.01)

(52) U.S. Cl. ................... 429/512; 429/523
(58) Field of Classification Search ............ None
See application file for complete search history.

(56) References Cited

U.S. PATENT DOCUMENTS

| | | |
|---|---|---|
| 4,808,493 A | 2/1989 | Breault |
| 5,702,839 A | 12/1997 | Frost et al. |
| 6,916,573 B2 * | 7/2005 | Trabold et al. ............ 429/39 |
| 2002/0150804 A1 | 10/2002 | Srinivasan et al. |

FOREIGN PATENT DOCUMENTS

| | | |
|---|---|---|
| CA | 2003-518724 | 5/2001 |
| JP | 57-191963 | 11/1982 |
| JP | 6-150944 | 5/1994 |
| JP | 7240204 | 12/1995 |
| JP | 2002-289203 | 10/2002 |
| JP | 2003-168443 | 6/2003 |
| JP | 2005-044797 | 2/2005 |

* cited by examiner

Primary Examiner—John S Maples
(74) Attorney, Agent, or Firm—Harness, Dickey & Pierce, P.L.C.

(57) ABSTRACT

A fuel cell including a membrane electrode assembly composed of a ionically conductive member sandwiched between a pair of electrodes. At least one of the electrodes including a catalyst loading characterized by catalytic activity that varies in proportion to the catalyst loading. Moreover, the fuel cell includes a flow path for supplying gaseous reactants to the electrodes and the catalyst loading is varied according to the flow path geometry.

1 Claim, 13 Drawing Sheets

VARIABLE CATALYST LOADING BASED ON FLOW FIELD GEOMETRY

CROSS-REFERENCE TO RELATED APPLICATIONS

This application is a continuation of U.S. patent application Ser. No. 10/700,237, filed on Nov. 3, 2003, now abandoned. The disclosure of this above application is incorporated herein by reference.

FIELD OF THE INVENTION

The present invention relates to fuel cells and, more particularly, to a membrane electrode assembly for a fuel cell.

BACKGROUND OF THE INVENTION

Fuel cells are increasingly being investigated as a power source for electric vehicles and other applications. One such fuel cell is the PEM (i.e. Proton Exchange Membrane) fuel cell that includes a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between a pair of electrically conductive fluid distribution elements (i.e., bipolar plates) which serve as current collectors for the electrodes, and contain a so-called "flow field" which is an array of lands and grooves formed in the surface of the plate contacting the MEA. The lands conduct current from the electrodes, while the grooves between the lands serve to distribute the fuel cell's gaseous reactants evenly over the faces of the electrodes. Gas diffusion media, which are typically porous graphite/carbon paper, are positioned between each of the electrically conductive fluid distribution elements and the electrode faces of the MEA, to support the MEA where it confronts grooves in the flow field, and to conduct current therefrom to the adjacent lands.

The electrodes of the MEA generally include an electrochemically active region or area formed of electrochemically active material. In this regard, the electrochemically active areas of each electrode include catalyst-coated particles embedded in a polymer binder. This electrochemically active area, however, may include different particles that are either too active or lack a desirable activity during operation of the fuel cell. The activity or lack of activity may result in failure of the electrodes due to the development of pinholes, catalyst layer cracking, delamination, or a general degradation of the electrode. As such, it is desirable to have a MEA that includes electrodes where the electrochemical activity may be controlled which will assist in preventing the above drawbacks.

SUMMARY OF THE INVENTION

The present invention is directed to a fuel cell including a membrane electrode assembly composed of a ionically conductive member sandwiched between a pair of electrodes. At least one of the electrodes including a catalyst loading characterized by catalytic activity that varies in proportion to the catalyst loading. Moreover, the present invention includes a flow path for supplying gaseous reactants to the electrodes and the catalyst loading varies along the flow path.

Furthermore, the present invention is directed to a method of controlling a current density in a fuel cell including providing an electrically conductive fluid distribution element with a flow field and providing an membrane electrode assembly including an ionically conductive member and an electrode. A catalyst loading of the electrode is varied according to a geometry of channels included in said flow field.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
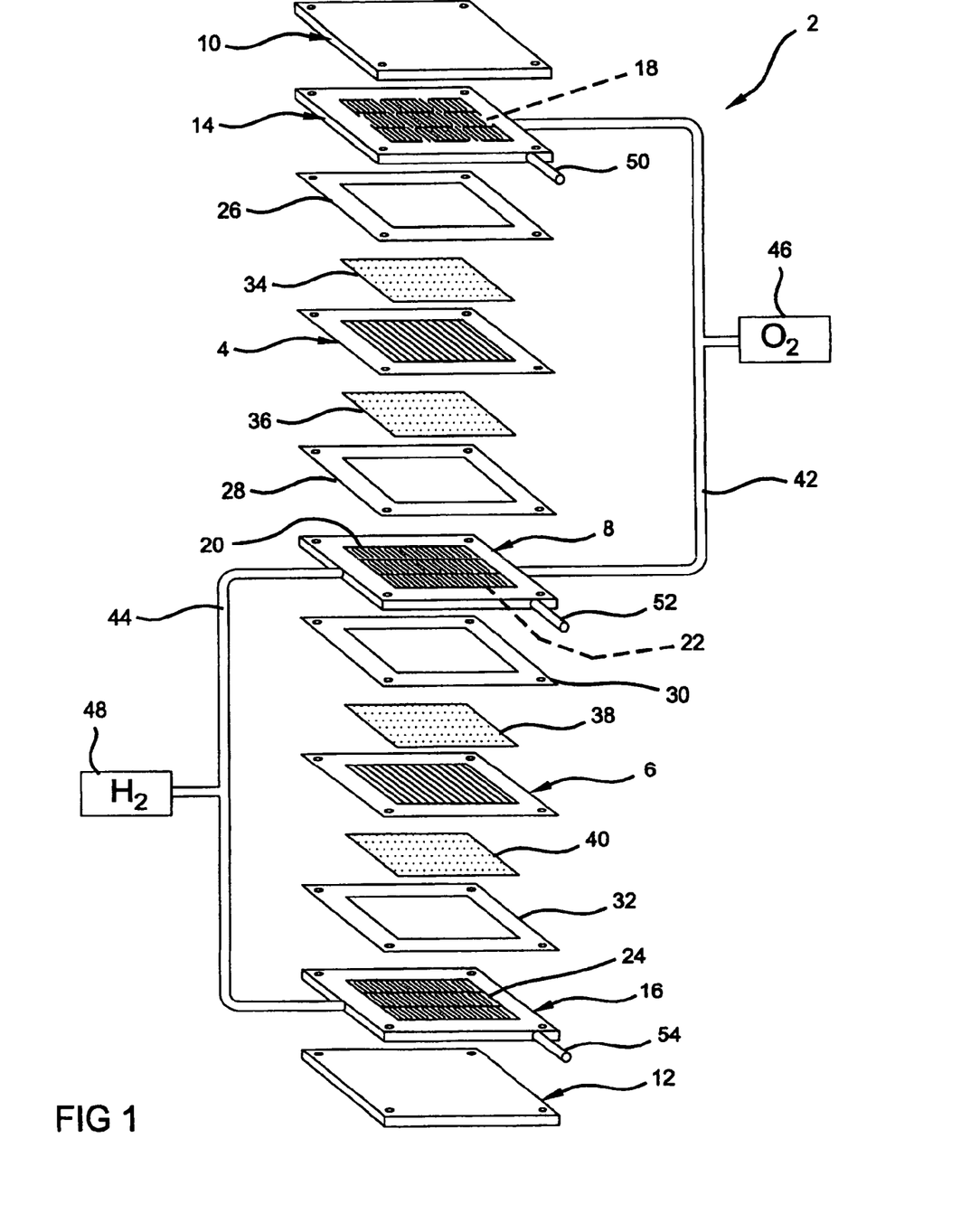
FIG. 1 is a schematic, exploded illustration of a PEM fuel cell stack (only two cells shown)

FIG. 1 depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between stainless steel clamping plates, or end plates 10 and 12, and end contact elements 14 and 16. The end contact elements 14 and 16, as well as both working faces of the bipolar plate 8, contain a plurality of grooves or channels 18, 20, 22, and 24, respectively, for distributing fuel and oxidant gases (i.e. $H_2$ and $O_2$) to the MEAs 4 and 6. Nonconductive gaskets 26, 28, 30, and 32 provide seals and electrical insulation between the several components of the fuel cell stack. Gas permeable conductive materials are typically carbon/graphite diffusion papers 34, 36, 38, and 40 that press up against the electrode faces of the MEAs 4 and 6. The end contact elements 14 and 16 press up against the carbon/graphite papers 34 and 40 respectively, while the bipolar plate 8 presses up against the carbon/graphite paper 36 on the anode face of MEA 4, and against carbon/graphite paper 38 on the cathode face of MEA 6. Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, ambient air may be supplied to the cathode side as an oxygen source and hydrogen to the anode from a methanol or gasoline reformer, or the like. Exhaust plumbing (not shown) for both the $H_2$ and $O_2$ sides of the MEAs 4 and 6 will also be provided. Additional plumbing 50, 52, and 54 is provided for supplying liquid coolant to the bipolar plate 8 and end plates 14 and 16. Appropriate plumbing for exhausting coolant from the bipolar plate 8 and end plates 14 and 16 is also provided, but not shown.

Figure 2:
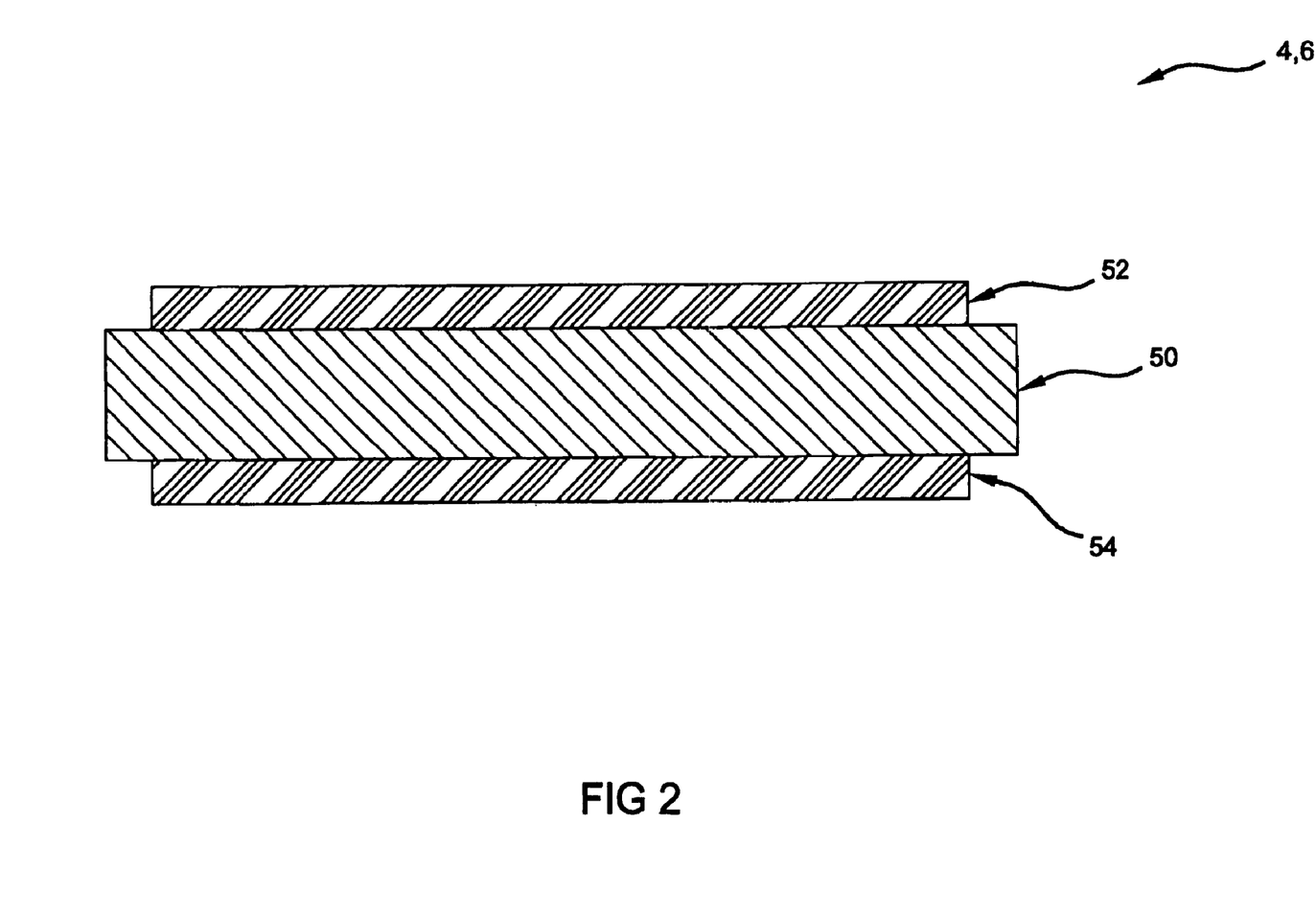
FIG. 2 is a cross-section of a membrane electrode assembly.

Each membrane electrode assembly (MEA) 4 and 6 includes an ionically conductive member sandwiched by an anode electrode 52 and a cathode electrode 54 (FIG. 2). The ionically conductive member 50 is preferably a solid polymer electrolyte membrane. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 50 may comprise any of the proton conductive polymers conventionally used in the art. Preferably, perfluorinated sulfonic acid polymers such as NAFION® are used. Furthermore, the polymer may be the sole constituent of the membrane or may be carried in the pores of another material. The anode electrode 52 and cathode electrode 54 preferably comprise catalyst-coated carbon or graphite particles embedded in a polymer binder which, like the polymer membrane, is a proton conductive material such as NAFION®.

Figure 3:
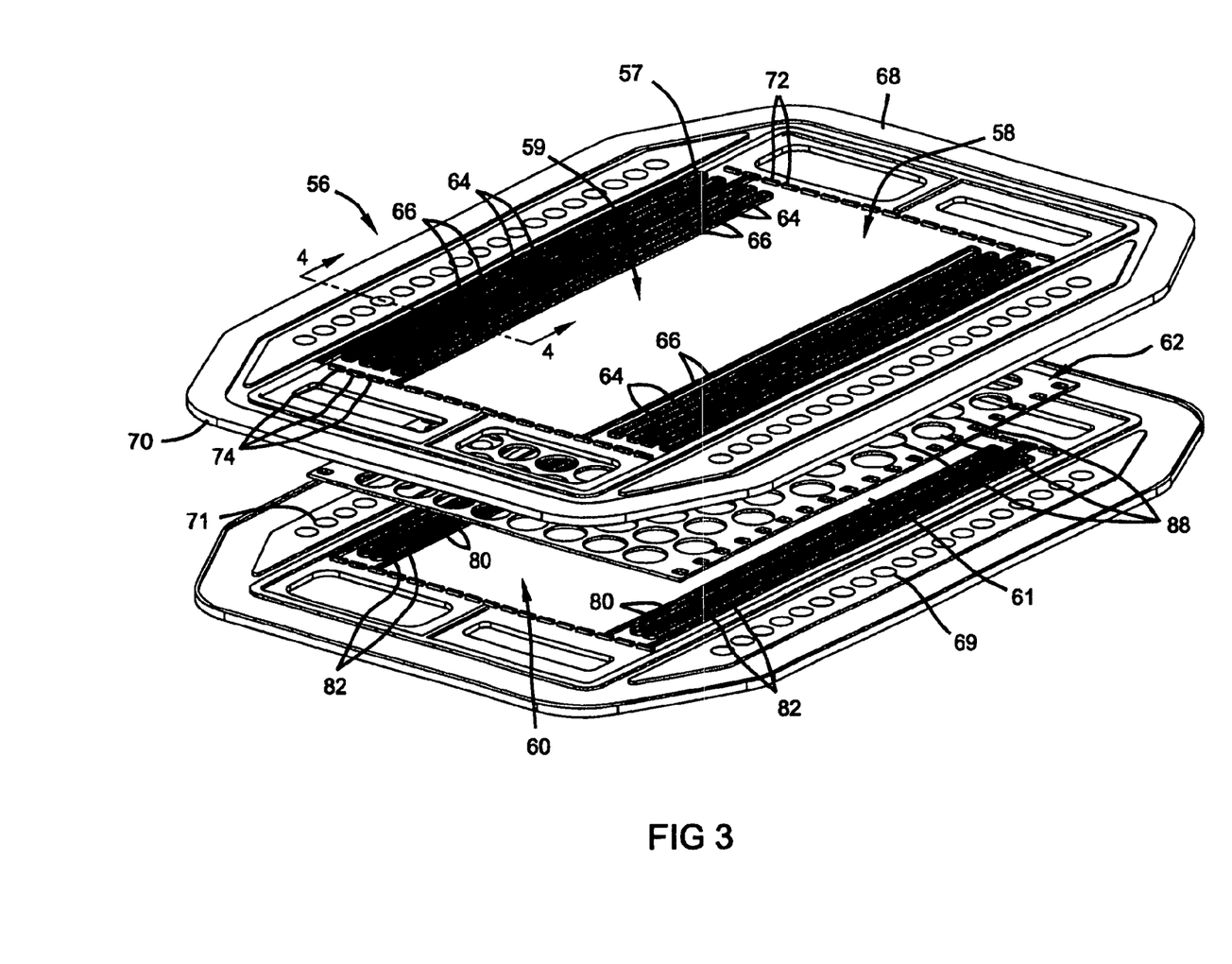
FIG. 3 is an exploded view of an exemplary electrically conductive fluid distribution element, bipolar plate with coolant, useful with PEM fuel cell stacks.
Figure 4:
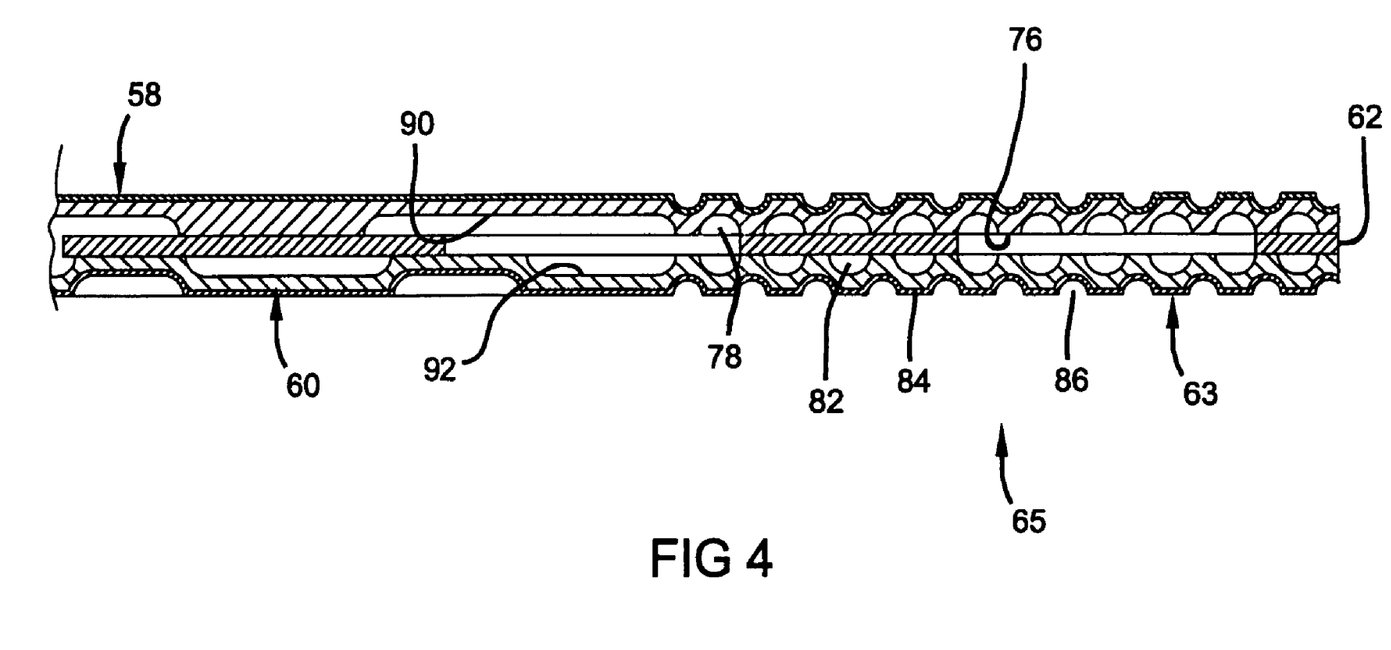
FIG. 4 is a sectional view in the direction of 4-4 of FIG. 3.

FIG. 3 is an exploded view of an exemplary bipolar plate 56 that may be used in conjunction with the present invention. The bipolar plate 56 comprises a first exterior metal sheet 58, a second exterior metal sheet 60, and an interior spacer metal sheet 62 interjacent the first metal sheet 58 and the second metal sheet 60. The exterior metal sheets 58 and 60 are made as thin as possible and may be formed by stamping, or any other conventional process for shaping sheet metal. The external sheet 58 has a first working face 59 on the outside thereof which confronts a membrane electrode assembly (not shown) and is formed so as to provide a flow field 57. The flow field 57 is defined by a plurality of lands 64 which define therebetween a plurality of grooves 66 which constitutes the "flow field" through which the fuel cell's reactant gases (i.e. $H_2$ or $O_2$) flow in a meandering or serpentine path from one side 68 of the bipolar plate to the other side 70 thereof. When the fuel cell is fully assembled, the lands 64 press against the porous material, carbon/graphite papers 36 or 38 which, in turn, press against the MEAs 4 and 6. For simplicity, FIG. 3 depicts only two arrays of lands 64 and grooves 66. In reality, the lands 64 and grooves 66 will cover the entire external faces of the metal sheets 58 and 60 that engage the carbon/graphite papers 36 and 38. The reactant gas is supplied to grooves 66 from inlet manifolds 72 that lie along one side 68 of the fuel cell, and exits the grooves 66 via another array of manifolds 74 that lie adjacent the opposite side 70 of the fuel cell. As best shown in FIG. 4, the underside of the sheet 58 includes a plurality of ridges 76 which define therebetween a plurality of channels 78 through which coolant passes during the operation of the fuel cell. The coolant channel 78 underlies each land 84 while a reactant gas groove 86 underlies each ridge 76. Alternatively, the sheet 58 could be flat and the flow field formed in a separate sheet of material.

Metal sheet 60 is similar to sheet 58. The internal face 61 of sheet 60 is shown in FIG. 3. In this regard, there is depicted a plurality of ridges 80, defining therebetween, a plurality of channels 82 through which coolant flows from one side 69 of the bipolar plate to the other 71. Like sheet 58 and as best shown in FIG. 4, the external side of the sheet 60 has a working face 63. Sheet 60 is formed so as to provide a flow field 65. The flow field 65 is defined by a plurality of lands 84 thereon defining a plurality of grooves 86 which constitute the flow field 65 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60, respectively. Thus, channels 78 and 82 form respective coolant flow fields at the interior volume defined by sheets 58 and 60.

In order to optimize and control a current density produced by a fuel cell utilizing the bipolar plate described above, an exemplary electrode shown in FIG. 5 may be utilized in accordance with a first embodiment of the present invention. The electrode 94, which may be used as either an anode electrode or cathode electrode, includes a peripheral electrochemically active region 96 and a central electrochemically active region 98. The composition of the electrochemically active regions may be any electrochemically active material conventionally used in the art. In this regard, as stated above, the electrochemically active regions preferably comprise catalyst-coated carbon or graphite particles embedded in a polymer binder which may be a proton conductive material such as NAFION®. The electrochemically active regions will preferably include platinum as the catalyst, although other catalysts such as palladium, platinum-ruthenium, and other Pt/transition-metal-alloys may be used.

Figure 5:
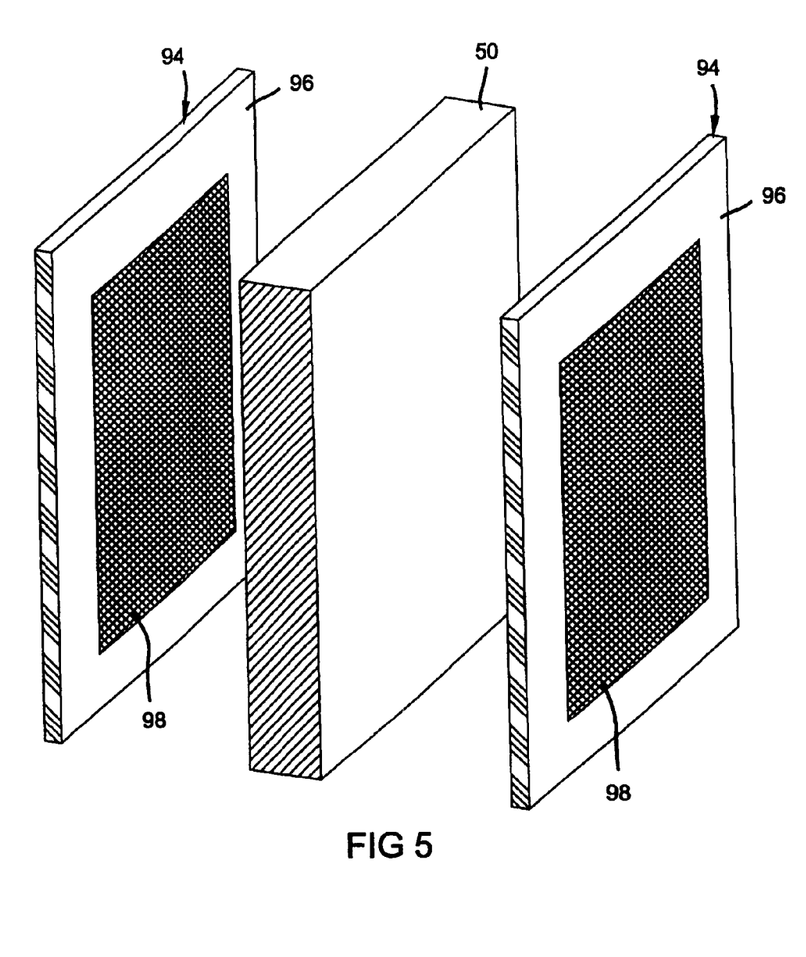
FIG. 5 is an exploded view of an MEA utilizing an electrode with a variable catalyst loading in conjunction with the present invention.

Preferably, the peripheral catalyzed region 96 includes a catalyst loading that is less than a catalyst loading in the central catalyzed region 98. For example, the peripheral region 96 may include a catalyst loading of 0.2 mg/cm$^2$ and the central region 98 may include a loading of 0.6 mg/cm$^2$. Further, it is preferable that both the peripheral region 96 and the central region 98 include the same surface area, although the embodiment should not be limited thereto. For example, both the peripheral and central regions include a total active area of 250 cm$^2$. In utilizing such a configuration, the electrochemical activity in the peripheral region 96 will be less than the electrochemical activity in the central region 98, but the overall catalyst loading will be 0.4 mg/cm$^2$. As such, controlling the electrochemical activity in the peripheral regions 96 assists in preventing the development of pinholes, catalyst layer cracking, delamination, and a general degradation of the electrode 94.

More specifically, as the reactant gases are supplied to grooves 66 from the inlet manifolds 72 of the bipolar plate, the area of the peripheral catalyzed region 96 is subjected to an increased amount of the reactant gases. That is, the peripheral region 96 is adjacent the inlet 72 and therefore, adjacent to a higher pressure area that provides a more continuous stream of the reactant gases to the catalyst of the electrode 94 in the peripheral catalyzed region 96. As such, a higher reaction rate is present in this area. Further, heat and water produced from the overall reaction of the fuel cell. Since a higher reaction rate occurs in this area, the generation of heat and water is more prevalent in this region which can produce flooding and the undesirable drawbacks enumerated above. By reducing the catalyst loading in the peripheral region 96 of the electrode 94 that is adjacent to the inlet manifolds 72 of the bipolar plate 56, the reaction rate of the this region may be controlled at a desired level.

Contrary to the peripheral region 96, the central catalyzed region 98 has an increased catalyst loading. Such a configuration is desirable because the catalyst located in this area of the electrode 94 is subjected to a smaller amount of the reactant gases due to being further away from the inlet 72. Thus, the central region 98 is in a lower pressure area. As such, a lower current density is achieved. More particularly, as the reactant gases supplied by the inlet manifolds 72 travel through the grooves 66 of the bipolar plate 56, the gases undergo a tortuous flow path which reduces the pressure and continuity of gases reaching the central electrochemically active areas of the electrode 94. As such, the electrochemical activity is reduced in these areas. By increasing the catalyst loading in this area, the electrochemical reaction rate of these areas may be increased and controlled to produce a current density that is uniform and more conducive to the overall life of the fuel cell.

In addition to the electrode 94 depicted in FIG. 5, a number of electrode configurations may be utilized in accordance with the present invention. More particularly, each electrode configuration, that is the configuration of the electrochemically active regions along the surface of the electrodes, may be prepared according to a number of different factors including the material from which the bipolar plate is manufactured, whether the bipolar plate is internally cooled by a coolant, and the flow field geometry of the bipolar plate.

Figure 6:
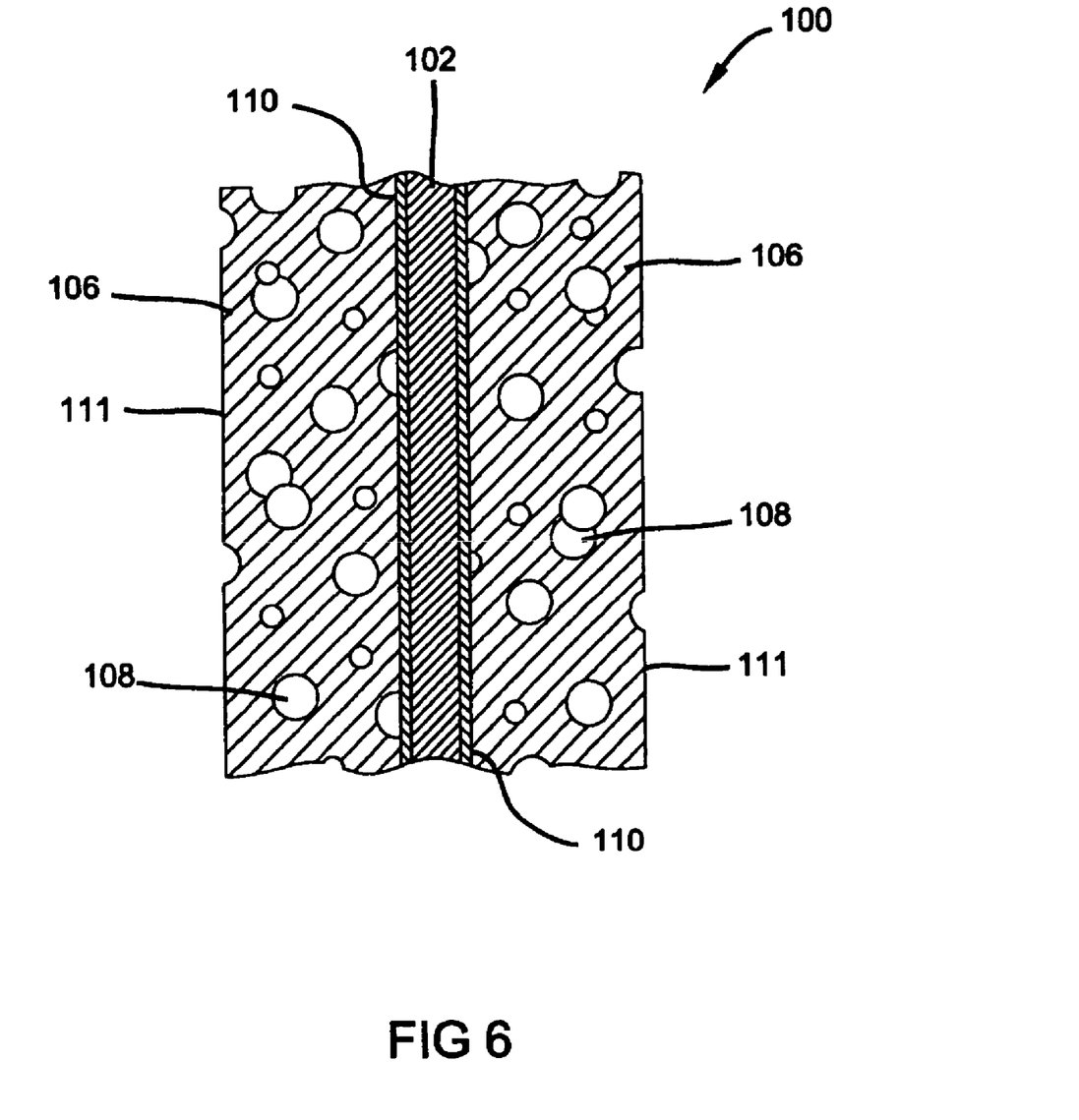
FIG. 6 is a partial cross-section of a bipolar plate that features a thin substrate with foamed metal flow fields attached to both sides of it.
Figure 7:
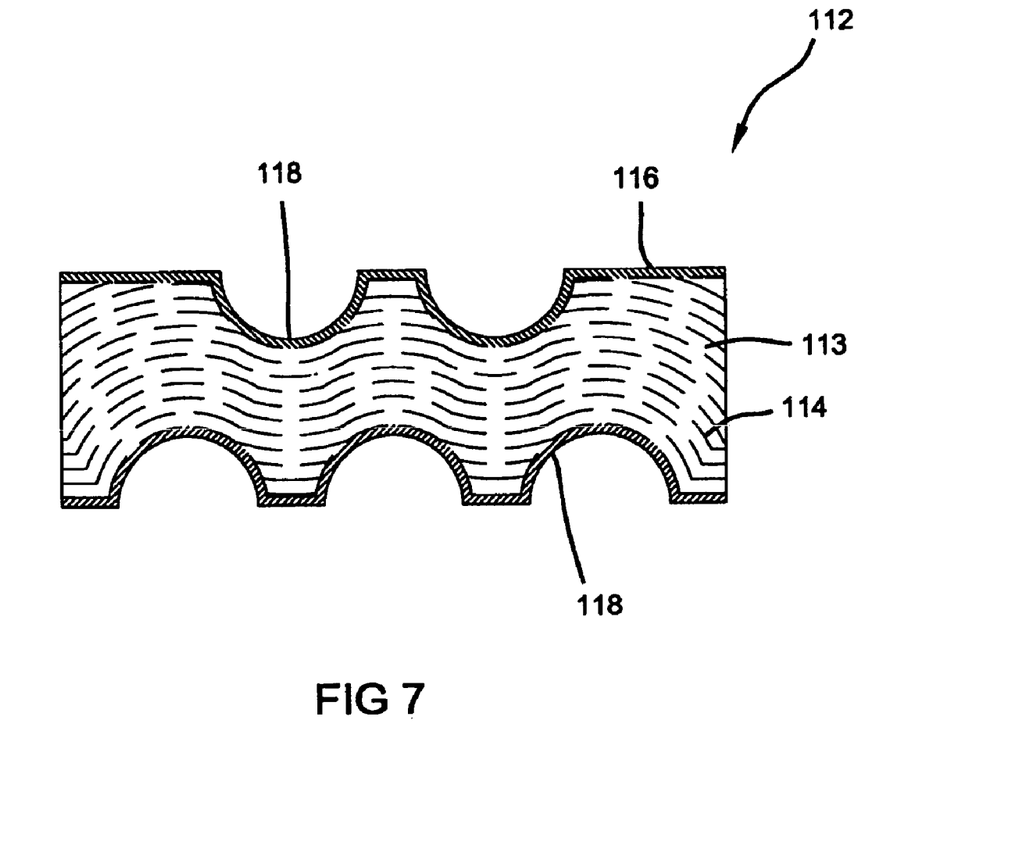
FIG. 7 is a partial cross-section of a bipolar plate made from a composite of electrically conductive particles dispersed in a binder matrix coated with an electrically conductive material.
Figure 8:
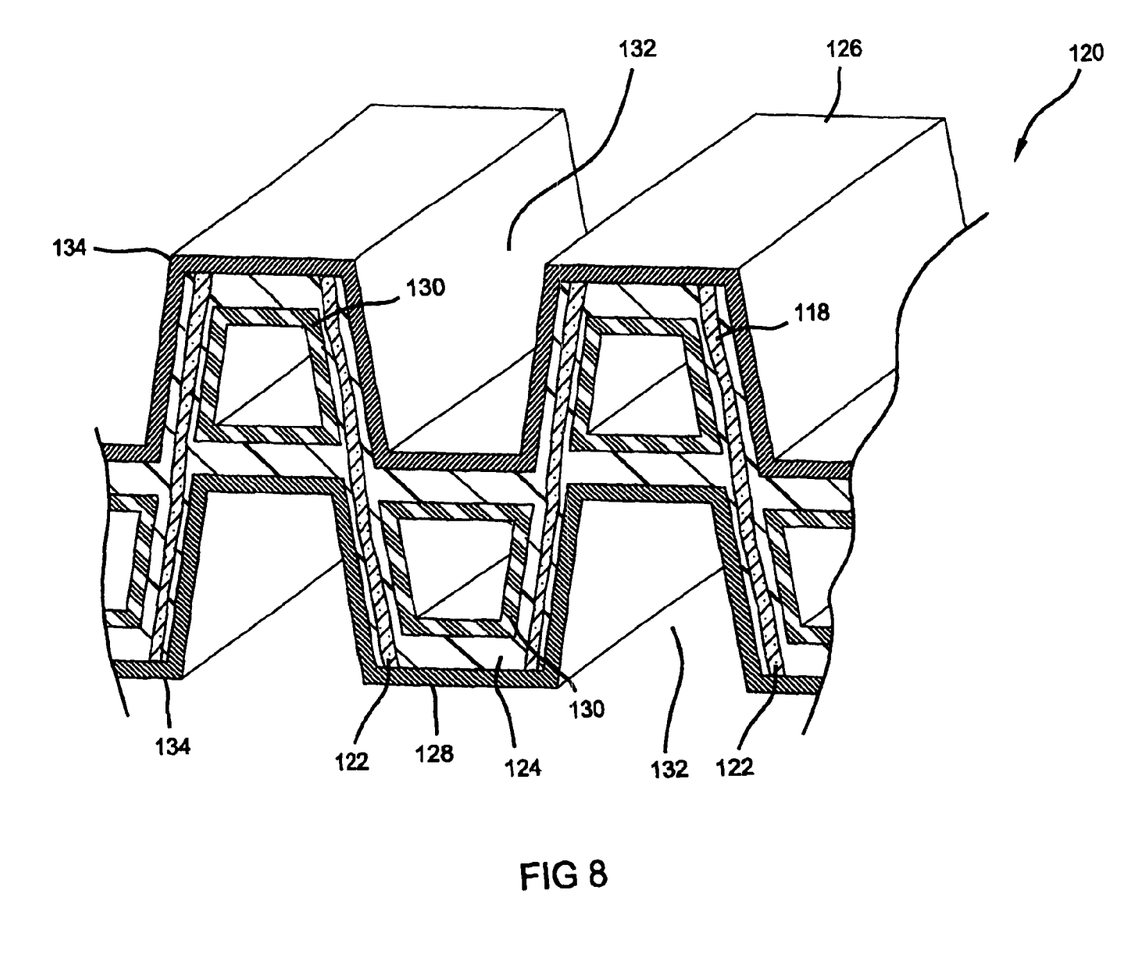
FIG. 8 is a partial cross-section of a bipolar plate with coolant channels flowing therethrough.

Examples of other bipolar plates that may be used are generally depicted in FIGS. 6-8. In FIG. 6, the element 100 is constructed with a thin, substrate sheet 102 having foam flow fields 106. This bipolar plate features a thin barrier sheet 102, preferably made from a solid titanium metal sheet, with foam 106 (about one-half to about 3 millimeters thick) attached by welding or brazing to both sides thereof. The sheet 102 forms the gas barrier and the foam 106 forms the flow fields. As can be seen, foam 106 has opposed major surfaces 110 and 111. The foam 106 has one major surface 110 facing the metal sheet 102 and another major surface 111 opposite 110. Typically, major surface 111 faces the MEA. These foams can be prepared as metal foams or carbon-based foams. Metals that can be prepared as a solid foam include copper, aluminum, nickel, titanium, silver, and stainless steel, with the preferred metals being nickel and stainless steel. A variety of foamed metals are available from AstroMet, located in Cincinnati, Ohio. Methods for producing these metal foams are described in U.S. Pat. No. 4,973,358. Carbon-based foams are available from Ultra Met.

It should be understood that the foam 106 being described herein is an open cell foam. This indicates that there are continuous flow paths or channels 108 throughout the foam 106 created by contiguous openings, or pores, which are open to one another through the thickness of the foam 106. Although the foam 106 is an open cell foam with continuous flow paths 108, the flow of the gaseous reactants through the foam 106 may be random and tortuous which may subject the electrode 94 to differing amounts of the gaseous reactants throughout the surface of the electrode 94 due to pressure variations. Notwithstanding the random nature of the flow paths 108 contained in the foam 106, however, the flow of gaseous reactants will be more prevalent along the edges of the electrode 94 due to the inlet manifolds 72 being located there. As such, the electrode 94 of the first embodiment depicted in FIG. 5 still provides the ability to control a current distribution over the course of the electrode surface.

Yet another bipolar plate is shown in FIG. 7 which depicts a bipolar plate 112 that includes a polymeric material 113 with a conductive fibrous filler 114 having a through-plane orientation which provides a path of conductivity through the element that also may be used. The polymeric material 113 is preferably a suitable thermoset polymer and more preferably selected from the group of material including silicone, poly-isobutylene, epoxy, vinyl ester and phenolic. Alternately, the polymeric material 113 is preferably a suitable thermoplastic and more preferably selected from the group of materials including polypropylene, ethylene tetrafluoro-ethylene (ETFE), nylon and rubber-modified polypropylene. While the foregoing thermoset and thermoplastic polymers containing a conductive fibrous filler 114 are presently preferred, one skilled in the art will readily recognize that other similar materials may also be suitable given the particular design specification of an application. For example, any conductive polymer, such as polyacetylene, that does not contain a conductive fibrous filler may be used and is not out of the scope of the present invention. Further, although a conductive coating 116 such as gold or any other electrically conductive coating is depicted in FIG. 7 which further facilitates electrical conductivity, the coating 116 is not necessary in accordance with the present invention.

Although not depicted in FIG. 7, the composite bipolar plate 112 is similar to the bipolar plate 56 depicted in FIG. 3 in that the grooves 118 of the flow field meander back and forth in a serpentine pattern along the surface of the composite plate 112. As such, the inlet manifolds (not shown) are also disposed along the edges of the bipolar plate 112 which will mandate the use of the electrode depicted in FIG. 5. Since the bipolar plate 112 is comprised of a composite material, however, heat will be dissociated differently throughout the fuel cell. As such, the catalyst loading of both the peripheral region 96 and central region 98 of the electrode 94 may be varied accordingly. That is, although a current density may be controlled across the surface of the electrode due to the electrode configuration of the first embodiment, the overall reaction of the cell still produces heat as a byproduct. Since a composite material has a thermal coefficient that differs from, for example, a steel or aluminum bipolar plate, the catalyst loading may be therefore decreased because a composite plate will absorb less heat than a conventional metal plate. As such, an increased current density may be achieved without sacrificing the lifetime of the electrode.

Now referring to FIG. 8, yet another bipolar plate that may be used is a polymeric bipolar plate 120 that contains a plurality of electrically conductive fibers 122 that are disposed within a polymeric body portion 124, each fiber 122 extending continuously from the first surface 126 of the polymeric body portion 124 to the second surface 128 of the polymeric body portion 124 in a through plane configuration. Preferably, the main body portion 124 is formed of a toughened, thermally conductive polymer such as carbon filled epoxy. However, the main body portion 124 may be formed of other suitable materials having such desirable properties. For example, the main body portion 124 may be constructed of silicone, poly-isobutylene, polyvinyl ester, polyester, phenolic, polypropylene, ETFE, nylon or rubber modified polypropylene. The thermal conductivity can be enhanced by loading the polymeric material with carbon, graphite, or other conductive particles.

Tubular members 130 that are disposed within the main body portion 124 of the bipolar plate 120 are operable to define a secondary flow field there-through to pass a cooling fluid through the separator plate for controlling the thermal energy thereof. The tubular members 130 are adapted to pass a cooling fluid through plumbing 70 to remove (or add) thermal energy from (to) the fuel cell stack. The coolant headers (not shown) which fluidly couple the tubular member 130 to the plumbing 70 should provide electrical insulation therebetween to eliminate shunt current between the fibers 122 and the tubular members 130.

The tubular members 130 are formed of a carbon-filled polymer, but should not be limited thereto. More particularly, it is contemplated that the tubular members 130 may be formed of any of a variety of materials that are thermally conductive and not susceptible to corrosion from exposure to the gaseous reactant or coolants commonly used in a fuel cell stack. Some other suitable materials include titanium, carbon, or stainless steel.

Similarly to the aforementioned bipolar plates, grooves 132 of the bipolar plate 120 in FIG. 8 preferably meander back and forth in a serpentine pattern with the inlet manifolds (not shown) disposed along the edges of the bipolar plate 120. In the bipolar plate 120 of FIG. 8, however, a coolant is provided to either cool or provide thermal energy to the plate 120 through the tubular members 130. As such, areas of the electrode will be subjected to differing areas of temperature according to the flow of the coolant. More particularly, as the coolant passes through the tubular members 130, a temperature of the corresponding groove may change due to energy loss or gain. The area of electrode adjacent to this groove, therefore, will also experience temperature change that will affect performance of the fuel cell. Accordingly, the catalyst loading may be varied according to these areas of differing temperature to adjust for these changes. Lastly, although depicted in FIG. 8, the conductive coating 134 comprised of gold or any other electrically conductive coating which further facilitates electrical conductivity is not necessary in accordance with the present invention It should be noted that the bipolar plates described above are only exemplary in nature and not intended to limit the present invention. More particularly, the present invention may be utilized with any bipolar plate known or contemplated in the art by determining areas of increased or decreased activity through testing of each bipolar plate before manufacture of the fuel cell. More specifically, the configuration of the electrochemically active areas of the electrodes may be determined in association with the choice of bipolar plate. This is because, in each of the exemplary bipolar plates described above, a number of variables affect the ideal configuration of the electrochemically active regions along the surface of the electrode. For example, the bipolar plate 56 in FIG. 3 is preferably formed of a metal such as stainless steel, aluminum, titanium, or the like. In contrast, the bipolar plates of FIGS. 7 and 8 are preferably formed of a polymeric material. As described above, each of these bipolar plates will dissociate heat and conduct the current produced during the course of the reaction of the fuel cell in a different manner. Accordingly, over the surface of the electrode and in accordance with the present invention, the catalyst loading is adjusted to control the reaction rate and current production of the fuel cell. Further, depending on the configuration of the flow field, the catalyst loading is further adjusted.

Figure 9:
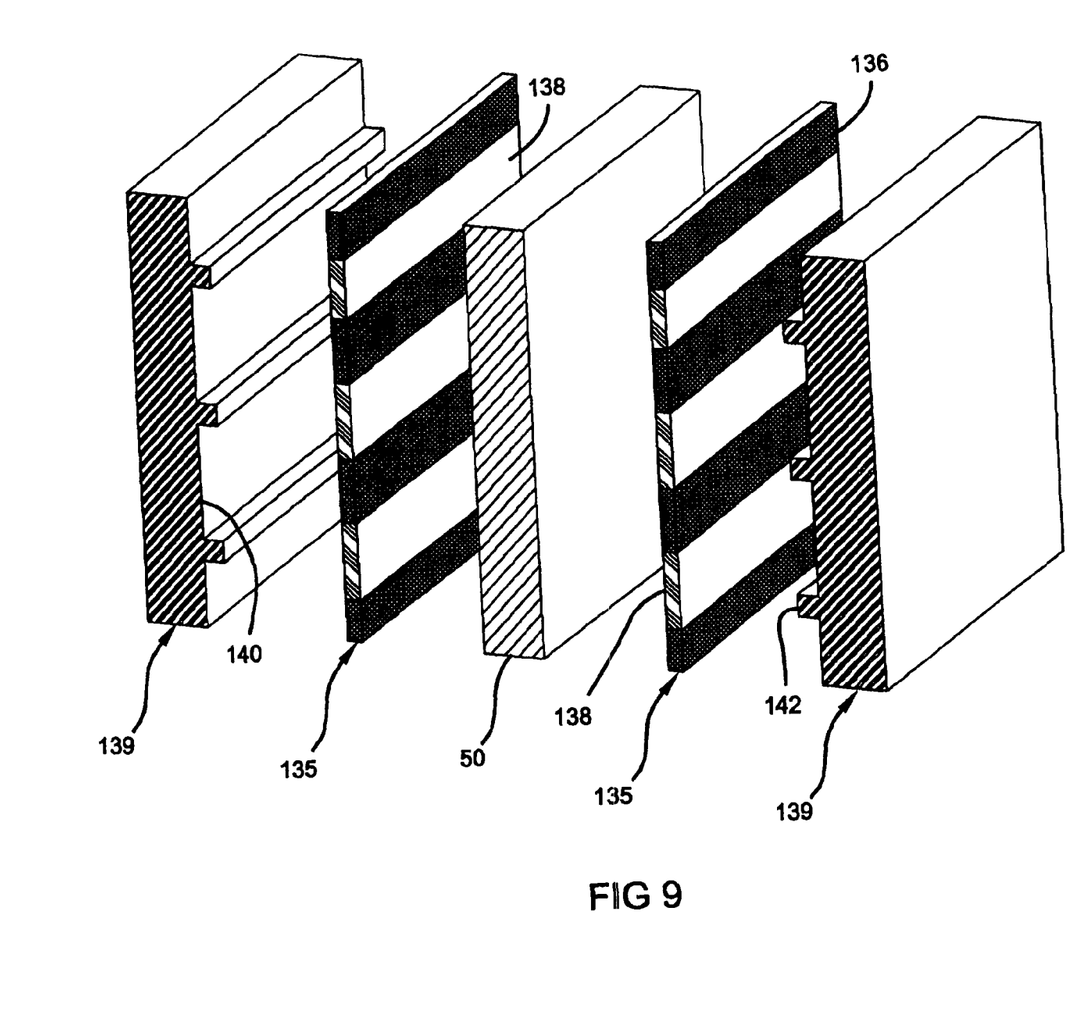
FIG. 9 is an enlarged, exploded view of a fuel cell according to a second embodiment of the present invention.
Figure 10:
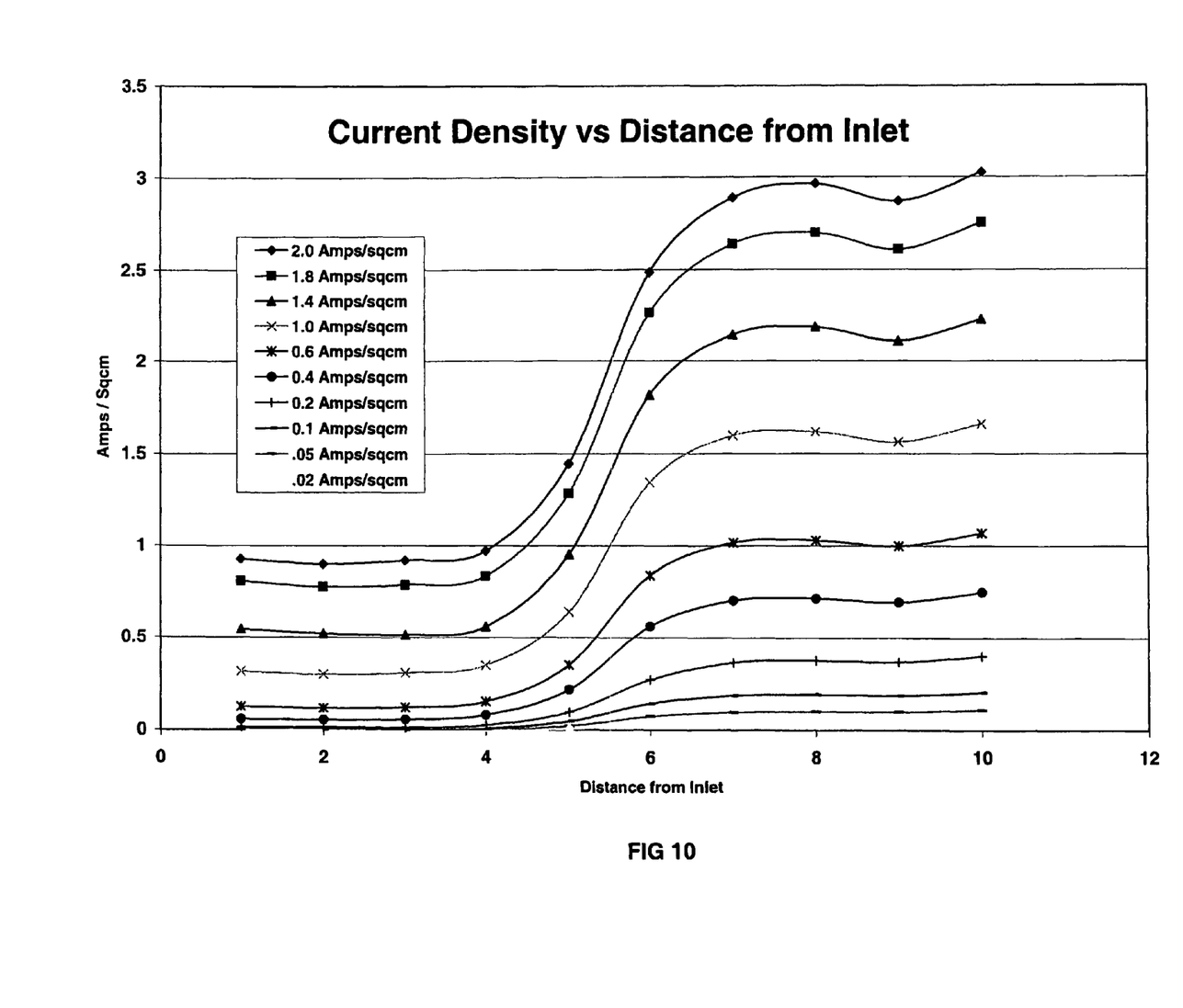
FIG. 10 is a graph depicting the relationship of current density with respect to the distance away from an inlet manifold.
Figure 13:
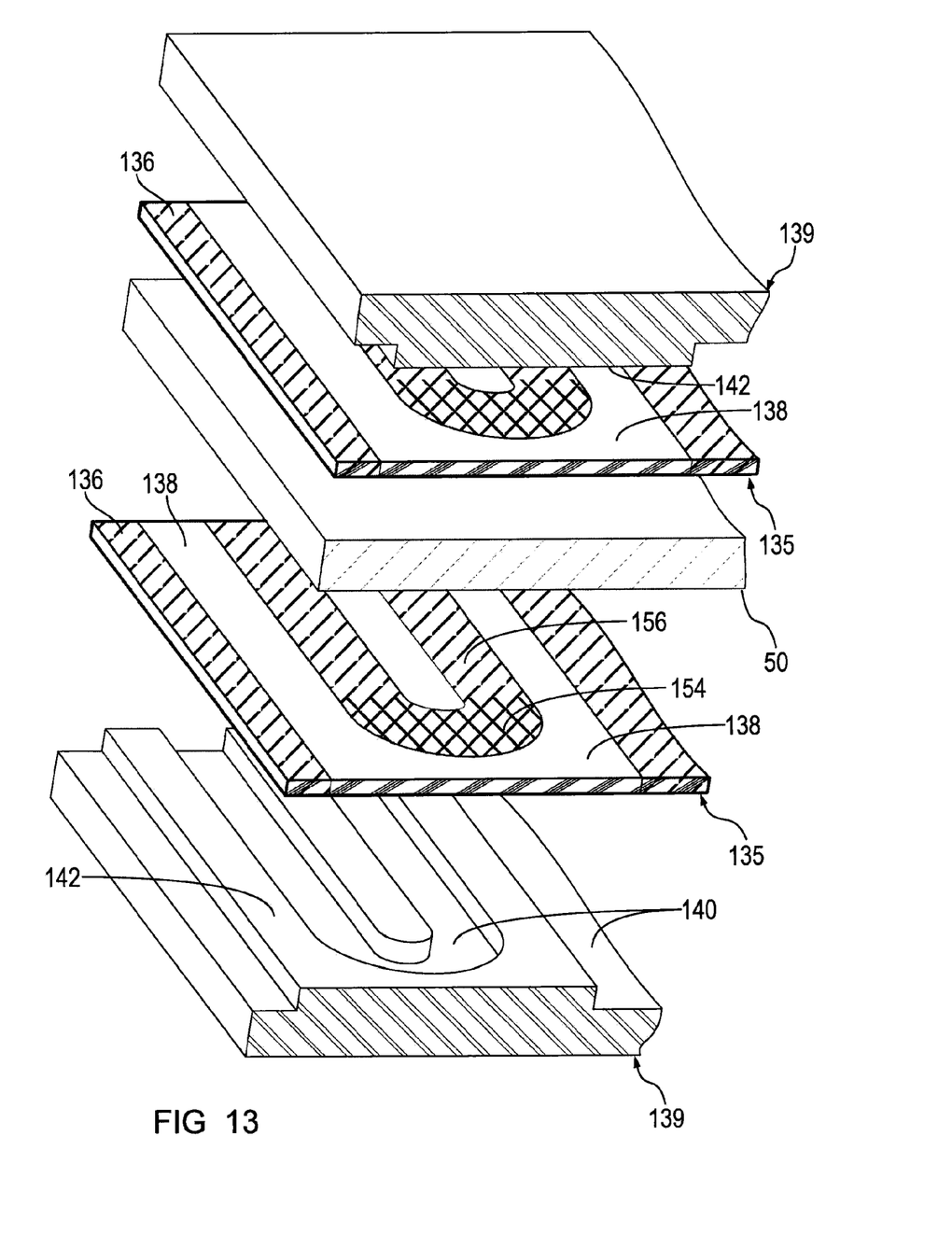
FIG. 13 is an enlarged, exploded view of a fuel cell according to an embodiment of the present invention.

Once more referring to FIG. 3, it can be seen that the grooves 66 and channels 80 meander back and forth across the surface of the plate 56. In such a serpentine pathway, the gaseous reactants undergo tortuous flow throughout each of the grooves 66, and therefore, the electrochemically active regions of the electrode are subjected to differing amounts of reactants at different areas of the electrode. In order to increase the current density in areas of the electrode that are not subjected to a satisfactory amount of reactant or to lower the current density in areas that are subjected to a surplus of gaseous reactant which creates either too much heat or water, the catalyst loading may be adjusted by either increasing or decreasing the loading, depending on the current density at each area of the electrode. As such, using the bipolar plate depicted in FIG. 3 as an example, an electrode that utilizes a stripe-shaped pattern of electrochemically active regions may be used where alternating electrochemically active regions include variable catalyst loadings. Such an electrode 135 is shown in FIG. 9. As shown in FIG. 9, electrochemically active regions 136 where the catalyst loading is increased or decreased are in line with, or correspond to, a groove 140 of the bipolar plates 139. As such, the expensive catalyst will not be wasted in the stripe-shaped areas 138 that are in contact with a land 142 of the bipolar plate 139, which does not contribute a substantial amount to the overall reaction of the fuel cell. Moreover, using the bipolar plate 56 in FIG. 2 again as an example, the grooves 66 undergo turns in the serpentine pathway. In these turns, the gaseous flow may be restricted and therefore, the catalyst loading may be increased in these areas. FIG. 13 shows electrode 135 having catalyst loading increased in an active area 154 corresponding to where a groove 140 undergoes a turn. Further, different grooves 66 may experience differing amounts of gaseous reactants depending on the distance away form the inlet manifold 72 due to a decrease in pressure at greater distances from the manifold 72. As such, these areas mandate an increased amount of catalyst in order to increase the current density to a desired level. This phenomenon is graphically depicted in FIG. 10, where it can be seen that as the distance (groove number) from the inlet manifold increases, the current density decreases.

It should be noted that although the above embodiment has been described with stripe-shaped electrochemically active regions 136, the present invention should not be limited thereto. More particularly, the electrochemically active regions 136 could be dot-shaped or any other shape that provides localized control of the current density over the surface of the electrode 135.

Further, each of the above embodiments has been described with respect to a serpentine flow field where each of the flow paths meanders back and forth across the surface of the bipolar plate. The present invention, however, is not limited to only a serpentine flow field. More particularly, the present invention contemplates that the catalyst loading may be varied according to any flow field known in the art. For example, the present invention may be used in conjunction with a flow field where the flow paths include one pass that traverses merely from an inlet located at one edge of the bipolar plate to an outlet located at another edge of the bipolar plate. In this manner, the flow field may be simplified. Other examples of flow field designs are described in U.S. Pat. Nos. 6,503,653; 6,358,642; 6,309,773; and 6,099,984.

In order to determine the localized areas of the electrode that require a variable catalyst loading based on the bipolar plate material and flow field geometry, the anode and cathode flow field plates of the bipolar plate are electrically separated from one another with an array of resistors between such anode and cathode flow field plates. The method relies upon the relationship between the current traveling through any resistor of the array and the current leaving a region of the membrane electrode assembly (MEA) directly adjacent to that resistor. Then, the distribution of the current leaving an entire fuel cell is determinable by the array of resistors across the entire cross-sectional area of the cell. Given the resistance of each resistor being a known value, the current passing through a particular resistor is determined by measuring the voltage drop across such resistor. In this manner, the current produced by an MEA is determined as a function of position, by measuring the voltage drops across each resistor in the array. In other words, current as a function of position across the MEA, is monitored.

An equivalent approach is used to monitor the temperature distribution of a fuel cell. In one alternative, the array comprises temperature-sensing resistors, that is, thermistors, with each thermistor associated with a different region of the MEA. In another alternative, the assembly comprises respective arrays of thermistors and current-sensing resistors. This method relies upon the relationship between the temperature sensed by a thermistor being representative of the temperature of a region of the MEA directly adjacent to that thermistor. Then, the distribution of the temperature across an entire fuel cell is determinable by the array of thermistors across the entire cross-sectional area of the cell. Given the temperature coefficient of each thermistor being a known value, the temperature of each thermistor is determined by measuring the voltage drop across each thermistor. In this manner, the temperature of an MEA is determined as a function of position by measuring the voltage drops across each thermistor in the array. In other words, temperature as a function of position across the MEA, is monitored.

Figure 11A:
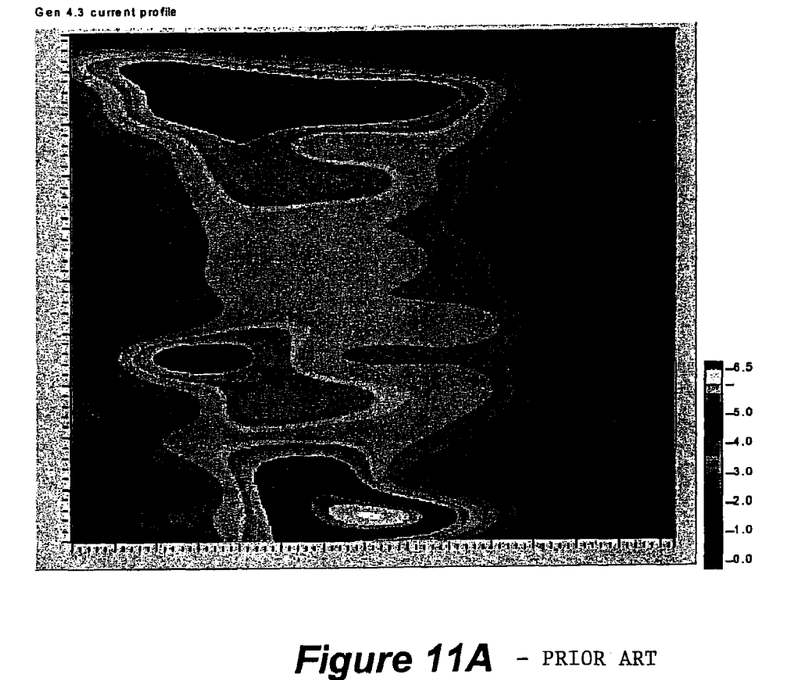
FIGS. 11A and 11B are current distribution intensity charts depicting a comparative electrode and an electrode according to the present invention.
Figure 11B:
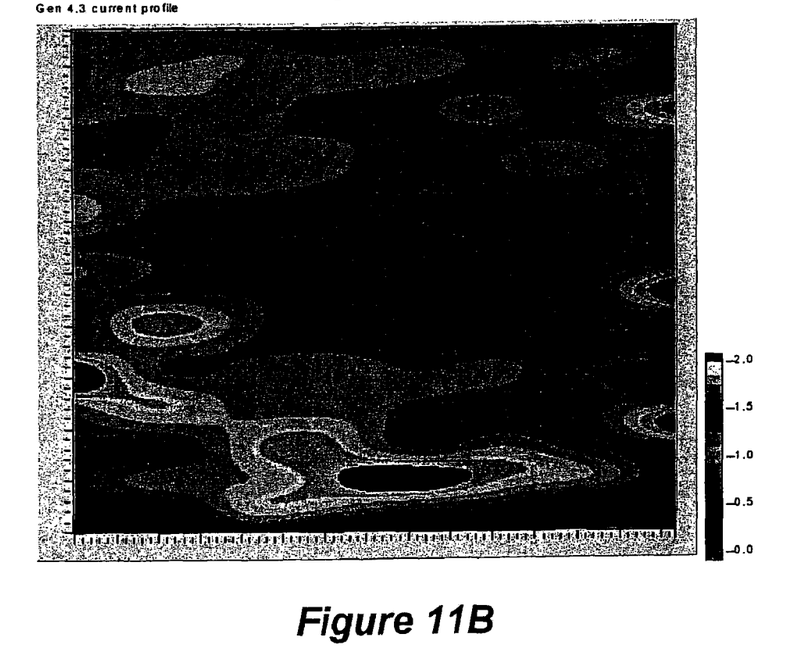

An example where the current distribution of an electrode was measured is depicted in FIGS. 11A and 11B. In FIG. 11A, a comparative electrode was used. That is, a comparative electrode that includes a uniform catalyst loading over the surface of the electrode was used. The electrode was divided into approximately 150 to 200 regions and inlets of the bipolar plate used to dissociate the gaseous reactants over the surface of the electrode were located at the top and bottom of each figure, respectively. When a comparative electrode with a uniform catalyst loading of 0.4 mg/cm2 was tested, hot spots, that is areas of increased electrochemical activity and current density, were prevalent around the inlets and top and bottom edges of the bipolar plate. As such, these hot spots are susceptible to an increased degradation over the lifetime of the fuel cell including the development of pinholes, catalyst layer cracking, and delamination.

Now referring to FIG. 11B, an electrode similar to that depicted in FIG. 5 was utilized. That is, an electrode with a decreased catalyst loading in the peripheral region and an increased catalyst loading in the central region of the electrode was used. As shown in FIG. 11B, the hot spots in the areas where the gas inlets and the top and bottom edges are present are dramatically reduced due to the electrode configuration providing the ability to control the current density. As such, the electrode with a decreased catalyst loading in the peripheral region will be less susceptible to degradation over the life of the fuel cell and, furthermore, will produce a more uniform current density over the surface of the electrode.

Now, methods of preparing the electrodes of the present invention will be described. It should be understood, however, that the following preparation methods are only exemplary in nature and that any method known to one skilled in the art may be employed. Preferably, the methods that may be used include a decal method, draw bar method, robotic ink dispensing, lithographic method, or a direct writing or MicroPen technique.

The decal method uses catalyzed carbon particles that are prepared and then combined with the ionomer binder in solution with a casting solvent. Preferable casting solvents are aqueous or alcoholic in nature, but solvents such as dimethylacetic acid (DMAc) or trifluoroacetic acid (TFA) also may be used.

The casting solution is applied to a Teflonated graphite sheet. The Teflonated sheet is then baked in an oven and subsequently hot-pressed to an ionically conductive member 50 such as a PEM. The Teflonated sheet is then peeled from the ionically conductive member 50 and the catalyst coated carbon or graphite remains embedded as a continuous electrode 52 or 54 to completely form the MEA 4 or 6 (FIG. 2).

In order to prepare an electrode 94 that comprises a central region 98 and a peripheral region 96, two casting solutions may be employed. More particularly, a first casting solution is applied to the Teflonated graphite sheet to form the central region 98 of the electrode 94. The first casting solution has a predetermined content of catalytic particles contained therein. A second casting solution is then applied to the Teflonated graphite sheet to peripherally frame the central region 98 as a peripheral region 96. The second casting solution also has a predetermined content of catalytic particles. In accordance with the present invention, the second casting solution has content of catalytic particles less than the first casting solution. The Teflonated sheet is then baked in an oven and subsequently hot-pressed to an ionically conductive member 50 such as a PEM. The Teflonated blank is then peeled from the ionically conductive member 50 and the central region 98 and peripheral regions 96 remain embedded to completely form the MEA 4 or 6.

The second casting solution is preferably applied directly after the first casting solution has been applied such that the first casting solution has not completely dried or solidified. Applying the casting solutions in such a manner will ensure that smooth, continuous electrodes will be formed on the ionically conductive member 50 so that there is no discontinuity in the electrodes 94. Furthermore, applying the casting solutions in such a manner will allow a gradient to form between the central region 98 and the peripheral region 96 of the electrode 6 or 8. In a variation of the above method, it may be preferable to apply the first and second casting solutions essentially simultaneously.

With respect to the draw bar method, a casting solution is applied in the same manner as above, however, in order to vary the catalyst loading, a draw bar is utilized to vary the thickness of the electrode in different regions such that some regions contain a greater amount of catalyst than others. More particularly, according to the electrode depicted in FIG. 5, the central region 98 will have a greater thickness than that of the peripheral region 96, and therefore, the central region 98 will have a greater catalyst loading.

Figure 12:
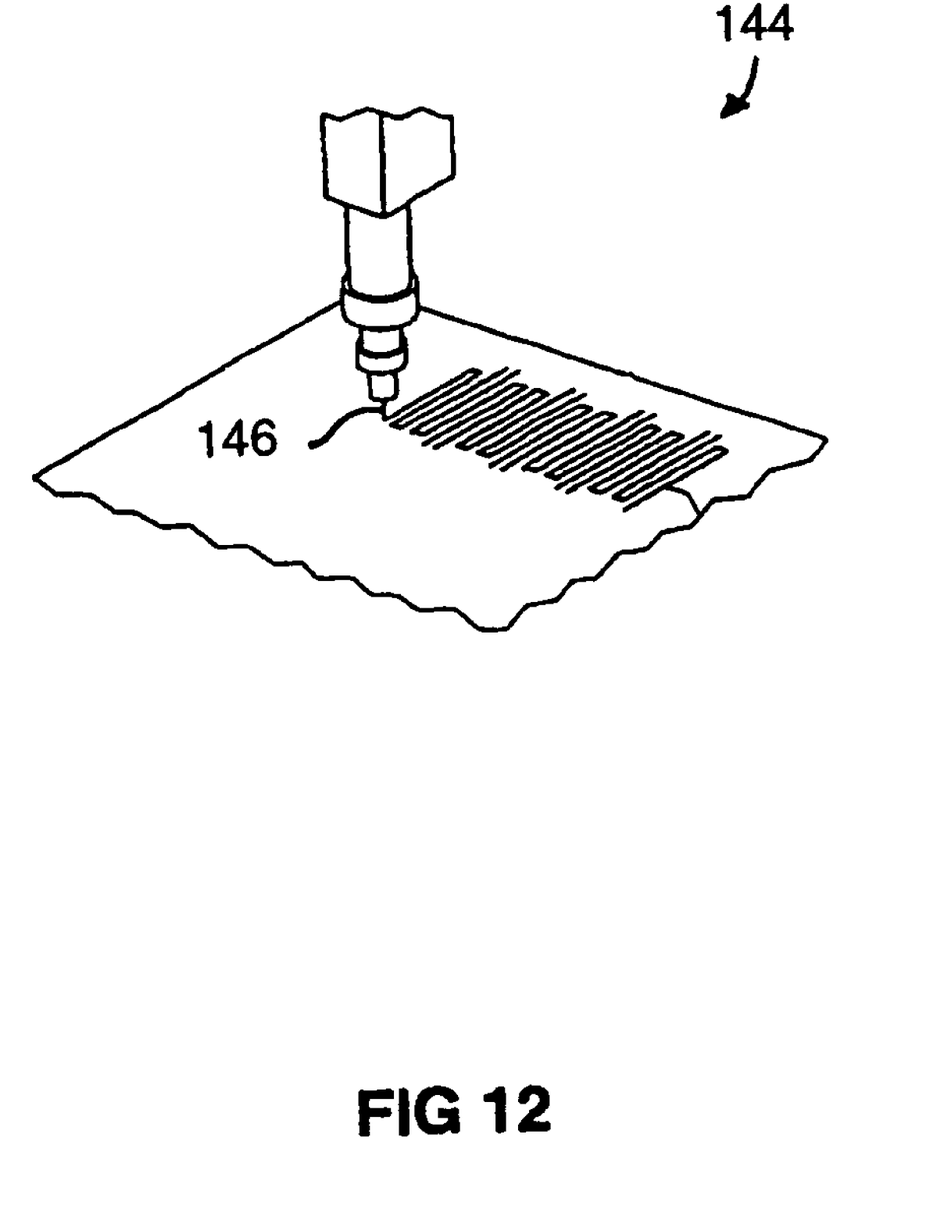
FIG. 12 depicts an example of a direct writing technique used to prepare an electrode according to the present invention.

In order to prepare the electrode depicted in FIG. 9 with the stripe-shaped electrochemically active regions 136, a direct writing method is preferably used, but the above decal and drawbar method may also be used. Direct writing is described in U.S. Pat. No. 4,485,387 to Drumheller and an example is shown in FIG. 12. A manufacturer of a device capable of the direct writing technique is MicroPen, Inc., which is a subsidiary of Ohmcraft, Inc. in Honeoye Falls, N.Y.

The direct writing technique employs a device 144 with a thin nozzle tip 146 to apply fluids over a wide range of viscosities to a variety of widths and thicknesses. For example, lines with widths ranging from about 0.001" to 0.080" (1 mil to 80 mils or 0.025 mm to 2.0 mm) and thicknesses ranging up to about 0.010" (10 mils or 0.25 mm) can be achieved with such a technique. Preferably, widths of the electrochemically active regions are at least half the width or up to about 1.25 times the width of the corresponding channels of the bipolar plates. Generally, widths of the channels are preferably in the range of about 0.10" to 0.120" (10 mils to 120 mils or 0.25 mm to 3.0 mm), and more preferably in the range of about 0.02" to 0.06" (20 mils to 60 mils or 0.50 mm to 1.5 mm). As such, widths of the electrochemically active material 60 are preferably in the range of about 0.005" to 0.150" (5 mils to 150 mils or 0.10 mm to 4.0 mm), and more preferably in the range of about 0.01" to 0.075" (10 mils to 75 mils or 0.25 mm to 2.0 mm).

The direct writing technique is used to apply a casting solvent of the electrochemically active material onto the Teflonated sheets at the desired widths and thickness in the desired pattern for the electrochemically active regions 136. After the solvent has been disposed onto the Teflonated sheets in the desired pattern, the blanks are oven dried. The Teflonated sheets are then hot pressed onto opposing surfaces of the ionically conductive member 50 and, subsequently, removed to leave the electrochemically active material disposed on the ionically conductive member 50 as the electrochemically active regions 136 of the anode and cathode in the preferable pattern of stripe shaped regions or dot shaped regions, to form an MEA 4 or 6.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell comprising:
   a membrane electrode assembly comprising an ionically conductive member and an electrode, said electrode having an active area comprising a catalyst; and
   a flow field having a plurality of flow paths facing said active area of said electrode;
   wherein the flow paths comprise turn areas, wherein catalyst loading in the active area facing the turn areas is increased relative to catalyst loading in the active area facing flow path areas adjacent to said turn areas.

* * * * *